(12) United States Patent
Basavanhally et al.

(10) Patent No.: US 6,633,719 B2
(45) Date of Patent: Oct. 14, 2003

(54) FIBER ARRAY COUPLER

(75) Inventors: Nagesh Ramamoorthy Basavanhally, Skillman, NJ (US); Ronald Edward Scotti, Whitehouse Station, NJ (US); John David Weld, Ledgewood, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 76 days.

(21) Appl. No.: 09/886,767

(22) Filed: Jun. 21, 2001

(65) Prior Publication Data

US 2002/0197047 A1 Dec. 26, 2002

(51) Int. Cl.⁷ .................................................. G02B 6/00
(52) U.S. Cl. ..................................................... 385/137
(58) Field of Search .......................... 385/137, 52, 115, 385/80, 54, 74, 68, 67, 50, 53, 57, 60

(56) References Cited

U.S. PATENT DOCUMENTS

| | | |
|---|---|---|
| 4,743,084 A | 5/1988 | Manning |
| 4,812,002 A | 3/1989 | Kato et al. |
| 4,830,450 A | 5/1989 | Connell et al. |
| 5,135,590 A * | 8/1992 | Basavanhally et al. ....... 156/64 |
| 5,247,597 A | 9/1993 | Blacha et al. |
| 5,550,942 A | 8/1996 | Sheem |
| 5,901,262 A | 5/1999 | Kobayashi et al. |
| 5,907,650 A | 5/1999 | Sherman et al. |
| 6,302,593 B1 * | 10/2001 | Haake .......................... 385/74 |
| 6,470,123 B1 | 10/2002 | Sherman et al. ............ 385/115 |

FOREIGN PATENT DOCUMENTS

JP        59 028 105        2/1984

* cited by examiner

Primary Examiner—Jean F. Duverne (57) ABSTRACT

A fiber array faceplate for receiving, precisely positioning and immobilizing bare optical fiber. The faceplate includes a plate arrangement of at least two mutually parallel plates each having an array of fixed apertures. At least one of the plates is movable in translational motion such that the at least two plates collectively define an array of adjustable-size apertures that can open wide enough to readily receive bare optical fiber and then decrease in size to immobilize the received optical fiber.

29 Claims, 7 Drawing Sheets

FIBER ARRAY COUPLER

FIELD OF THE INVENTION

The present invention relates to fiber optics. More particularly, the present invention relates to an article for aligning and fixing an array of optical fibers in a precise position.

BACKGROUND OF THE INVENTION

The Internet and emerging information services such as video-on-demand, high-definition television (HDTV) and video conferencing are creating a demand for high bandwidth ("broadband") digital networking. Networks that incorporate optical fiber have the potential to provide the high bandwidth and data rates needed for broadband digital networking. In most such networks, the optical signals are, however, switched at lower bandwidths via electronic switching fabrics that convert the optical signals to electrical signals and, after switching, reconvert the electrical signals to the optical domain for continued transmission.

An optical switching fabric that does not convert optical signals to electrical signals and so maintains optical signal bandwidth for high-speed switching has recently been developed. See, e.g., Bishop et al., "The Rise of Optical Switching," *Scientific American*, pp. 88–94, January 2001. This optical switching fabric uses free-space optics to direct an optical signal from one fiber to another using MEMS-based micro-mirrors. To accommodate the large number of optical signals typically carried through a telecommunications network, the switch fabric includes two sets of large fiber arrays (input and output) and an array of micro-mirrors.

To provide low-loss free-space optical switching between input and output fiber arrays, high positional and angular tolerances are required in the fiber array. In particular, for single-mode optical fiber as is typically used in optical communication networks (core: 6–9 microns in diameter; cladding: 125 microns in diameter), positional tolerances of less than ±2 microns from true position and angular tolerances of less than 0.5 degrees are required for each fiber in the fiber arrays.

To achieve these tolerances, fiber arrays typically incorporate a flat faceplate with a precisely positioned array of holes. Each of the holes receives a fiber and defines its position. The diameter of the holes must be no greater than about 126 microns to provide precise alignment for a fiber having a 125 micron-diameter cladding. As a consequence of the need to insert optical fiber into holes that are only marginally larger than the fiber cladding itself, a high-precision assembly process is required.

A need therefore exists for a device that is capable of providing precise spatial and angular positioning for an array of optical fibers while receiving such fibers by a relatively low-precision process.

SUMMARY OF THE INVENTION

This need is met, in accordance with the principles of the invention, by a fiber array coupler having a frame and a plate arrangement made up of at least two parallel plates. At least one of the plates is movable within the frame.

Each of the plates includes an array of fixed size apertures. The apertures can have any one of a variety of shapes, although apertures that have a shape that tapers linearly from a relatively larger region to a relatively smaller region, such as a triangle, teardrop, etc., are advantageously used. The fixed apertures in the two or more plates align to define an array of adjustable-size apertures. The size of the adjustable-size aperture is changed by moving the movable plate, which contracts or expands the opening.

In some variations, a fiber array coupler has two plates, each having teardrop-shape apertures. The plates have a 180-degree in-plane rotation relative to one another. In one configuration, the relatively larger sections of the teardrop shape of paired apertures align, i.e., are concentric, to define a maximum size opening that is suitable for receiving bare optical fiber, i.e., fiber stripped of any jacketing, etc. In another configuration, which is obtained by moving at least one of the plates, the relatively smaller sections of the teardrop shape of paired apertures align to define a minimum size opening that is suitable for immobilizing the bare optical fiber.

In some other embodiments described herein, the apertures on each plate in the plate arrangement can have a different shape. In still other embodiments, the number of apertures on each plate in the plate arrangement can be different.

BRIEF DESCRIPTION OF THE DRAWINGS

FIG. 1 depicts a fiber array faceplate having a frame and a plate arrangement of two plates, each plate comprising an array of apertures. In FIG. 1, the apertures in the two plates align in a configuration that is suitable for receiving a plurality of optical fibers, in accordance with the principles of the invention.

FIG. 6 depicts a fiber array faceplate having a frame and a plate arrangement of three plates, each plate comprising an array of apertures. In FIG. 6, the apertures in the plates align in a configuration that is suitable for immobilizing a plurality of optical fibers.

DETAILED DESCRIPTION

Figure 1:
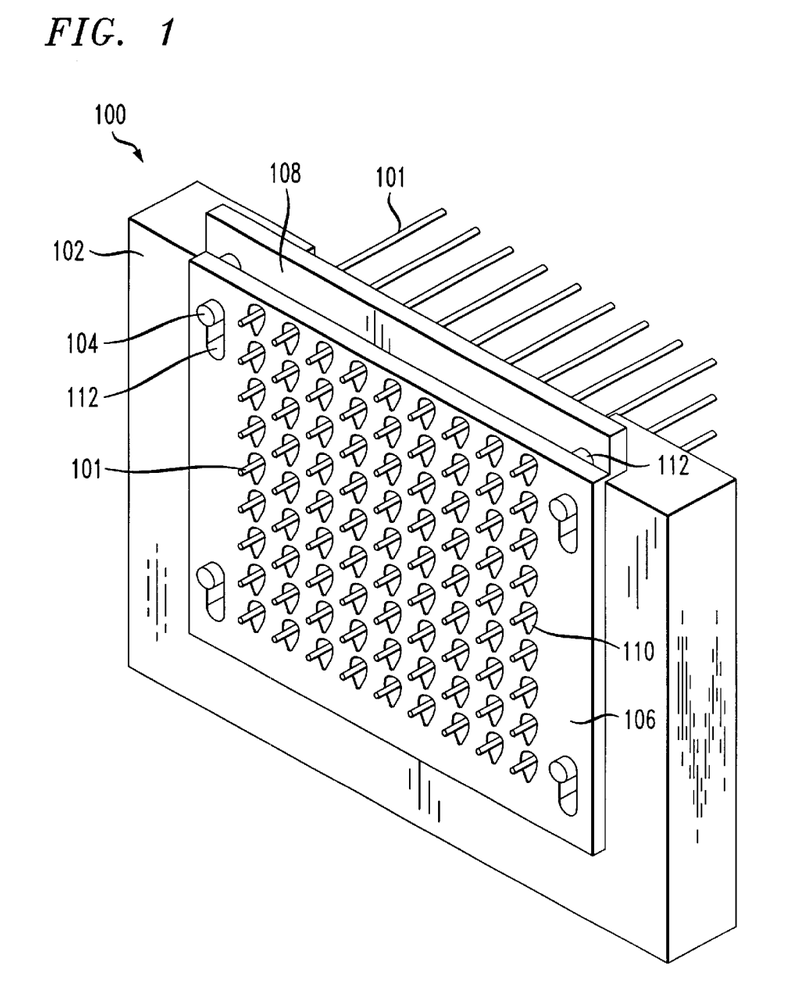

FIG. 1 depicts fiber array faceplate 100 in accordance with the principles of the invention. Fiber array faceplate 100 includes frame 102 and a plate arrangement that, in the embodiment depicted in FIG. 1, includes two plates; front plate 106 and back plate 108, interrelated as shown.

Frame 102 is sized to receive plates 106 and 108. Frame 102 advantageously has pins 104 that cooperate with slots 112 in plates 106 and 108. The illustrated slot-pin arrangement allows plates 106 and 108 to slide or move a distance equal to the length of slots 112 while maintaining engagement with frame 102. The slot-pin arrangement also aids in restricting the movement of plates 106 and 108 to translation only, i.e., no rotational motion. An alternative to the slot-pin arrangement depicted in FIG. 1 that achieves the same end, i.e., translational motion only, includes a frame that has individual channels (not shown) for receiving plates 106 and 108. The channels restrict movement of the plates along a single axis that is orthogonal to bare optical fibers 101.

First plate 106 and second plate 108 each have an array of apertures 110. FIG. 1 shows each aperture 110 receiving a single bare optical fiber 101. For the purposes of this specification, the term "bare optical fiber" means the fiber core and surrounding cladding stripped of any additional buffering material, coating, jacketing, etc.

Each aperture 110 has a fixed (i.e., unchanging) size and shape. For the purposes of this specification, the term "aperture" means an opening, etc., having a fixed size and shape, unless the term "aperture" is otherwise modified. In FIG. 1, apertures 110 have a "teardrop" shape. As described and illustrated later in this specification, apertures 110 can have many other shapes as well.

Figure 2:
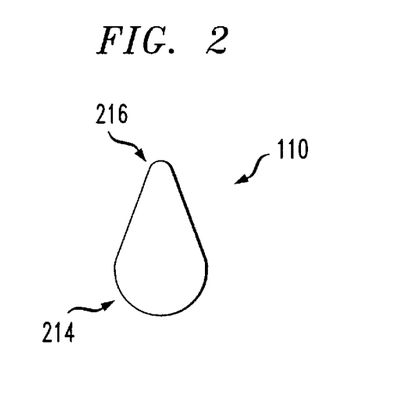
FIG. 2 depicts detail of a teardrop-shape aperture.

FIG. 2 depicts detail of aperture 110 of FIG. 1. Aperture 110 has first region 214 having a size that is suitable for receiving bare optical fiber and second region 216 having a size that is suitable for immobilizing bare optical fiber.

In illustrative aperture 110 depicted in FIG. 2, first region 214 is realized as the larger circular section of the "teardrop." By way of illustration, not limitation, the larger circular section can have a diameter of 500 microns, which is four times the diameter of the cladding of single mode fiber. Bare optical fiber can be received without undue difficulty by a somewhat smaller opening, e.g., 3× cladding diameter, etc. and, of course, by a larger opening, e.g., 6× cladding diameter. The factor of four is a compromise between apertures that are so large that the array of apertures becomes undesirably large and those that are so small that it becomes very difficult to pass a fiber through each aperture. Auxiliary pre-positioning guides that pre-group fibers into (multi) linear arrays before insertion into apertures 110 can simplify insertion and allow for a reduction in size of first region 214. Consequently, leeway exists, even toward smaller diameters, as to the size of first region 214. For the purposes of this specification, the phrase "size that is suitable for receiving bare optical fiber" means an opening that is at least about 2.5× the cladding diameter.

In illustrative aperture 110 depicted in FIG. 2, second region 216 is the smaller circular section of the "teardrop." The smaller circular section advantageously has a diameter of 126 microns (when used in conjunction with single-mode fiber), which is barely larger than the cladding diameter and is suitable for substantially immobilizing bare optical fiber. For the purposes of this specification, the phrase "size that is suitable for immobilizing bare optical fiber" means an opening that is no more than about 1 micron larger than the cladding diameter. Thus, for a fiber having a cladding diameter of 125 microns, the opening should be no more than about 126 microns in diameter.

Figure 3:
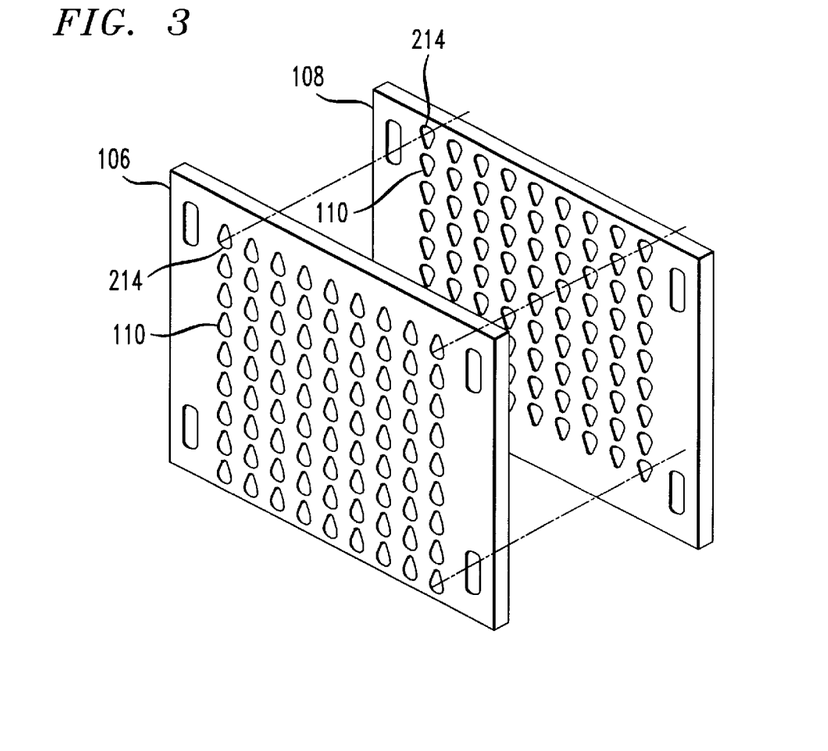
FIG. 3 depicts the two plates of FIGS. 1 and 2 without the frame and spaced from one another to show their relative orientation when receiving optical fibers.
Figure 4:
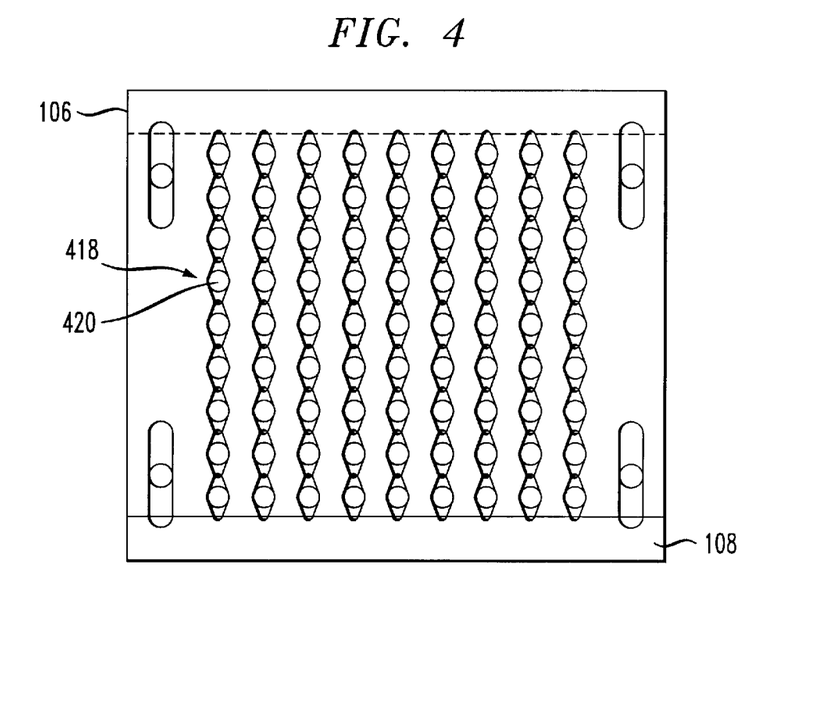
FIG. 4 depicts a front-view of the two plates shown in FIG. 3.

In accordance with the principles of the invention, the fixed apertures in the two or more plates in the plate arrangement align to define array of adjustable-size apertures (see FIG. 4). Adjustable-size apertures that are defined by a plate arrangement having two plates, e.g., fiber array face plate 100 depicted in FIG. 1, etc., are now described in conjunction with FIGS. 3, 4 and 5A–5E.

FIG. 3 depicts plates 106 and 108 without frame 102 in an "exploded" perspective view so that the relative orientation of apertures 110 in the two plates is discernable. In FIG. 3, apertures 110 in "front" plate 106 point upward, i.e., second region 216 pointing upward, while apertures 110 in "back" plate 108 point downward. In other words, the plates have a 180-degree, in-plane rotation relative to one another.

In the configuration depicted in FIG. 3, the larger circular section, i.e., region 214, of each aperture 110 in plate 106 is superposed or concentric with the larger circular section of each aperture 110 in plate 108. This is advantageously accomplished by translating plate 106 upward relative to plate 108. In this configuration, the adjustable-size apertures formed by paired apertures 110 in plates 106 and 108 have an opening that is equal to the diameter of the larger circular section of the "teardrop" (in the illustration—500 microns). In this configuration, the adjustable-size apertures have their maximum size, which is suitable for receiving bare optical fiber.

Adjustable-size apertures 418 formed by paired apertures 110 are perhaps more readily visualized in the illustration shown in FIG. 4, which depicts a front view of the plate arrangement shown in FIG. 3. Plate 106, which is the "front" plate in FIG. 4, is "higher" than plate 108. The alignment of the larger circular sections of paired apertures 110 manifests as the relatively larger circles or openings 420. Opening 420 is the size of adjustable-size aperture 418 in this configuration.

If the smaller circular sections (second region 216) of apertures 110 in the two plates were aligned, then adjustable-size apertures 418 would have an opening that is equal to the diameter of the smaller circular section of the "teardrop" (in the illustration—126 microns). In this configuration, the adjustable-size apertures have their minimum size, which is suitable for immobilizing bare optical fiber that has been inserted through apertures 110. This configuration is obtained by simply translating plate 106 downward (relative to its position in FIGS. 3 and 4). This translation, wherein the opening of an adjustable-size aperture is changed from a maximum size (as is suitable for receiving bare optical fiber) to a minimum size (as is suitable for immobilizing bare optical fiber), is depicted via a progression of illustrations in FIGS. 5A–5E.

Figure 5A:
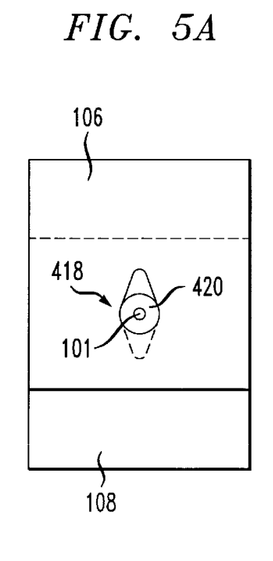
FIGS. 5A–5E depict the translation of one of the two plates to change the alignment of the apertures from an alignment suitable for receiving optical fibers (FIG. 5A) to an alignment suitable for immobilizing the plurality of optical fibers in a precise spatial position (FIG. 5E).

FIG. 5A depicts the configuration shown in FIGS. 3 and 4. That is, plate 106 is positioned "in front" of plate 108, apertures 110 in plate 106 point upward, plate 108 has a 180-degree in-plane rotation relative to plate 106, plate 106 is "higher" than plate 108 and the larger circular sections of paired apertures 110 align. For clarity, only a single adjustable-size aperture 418 is shown. In FIG. 5A, adjustable-size aperture 418 has a maximum size, represented by opening 420, which is suitable for receiving bare optical fiber 101.

Figure 5B:
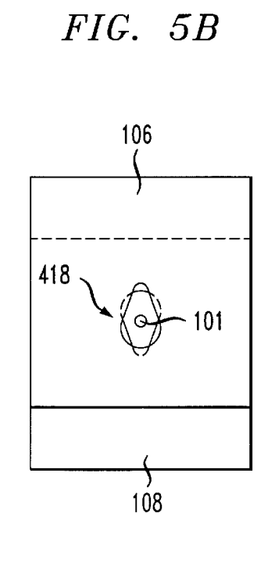
Figure 5C:
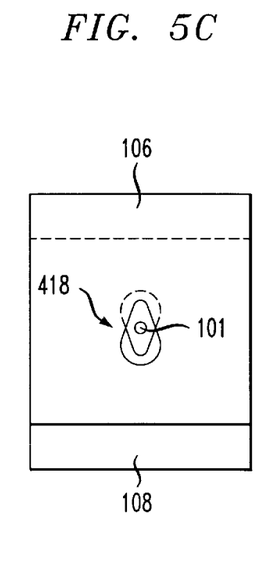

FIG. 5B depicts the plate arrangement of FIG. 5A after plate 106 has been translated downward a small amount. Adjustable-size aperture 418 now has a somewhat smaller opening, although bare optical fiber 101 can still be readily inserted through the paired apertures. In FIG. 5C, plate 106 is translated downward again, further decreasing the size of the opening in adjustable-size aperture 418. Inserting bare optical fiber 101 in this configuration would be problematic.

Figure 5D:
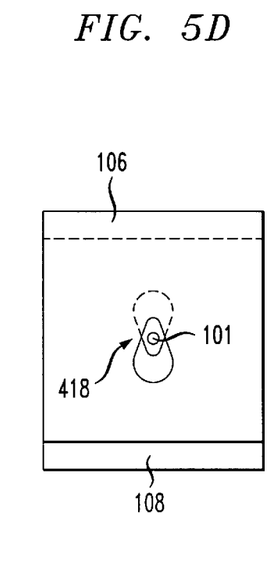
Figure 5E:
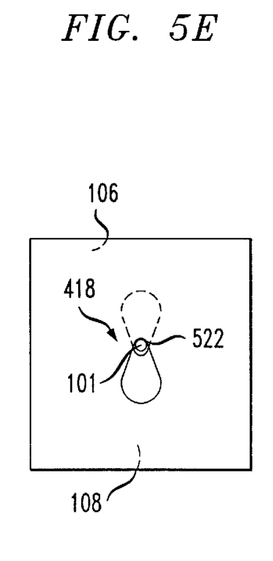

FIG. 5D shows the plate arrangement of FIG. 5C after further downward translation. And FIG. 5E depicts a configuration wherein the smaller circular sections (second region 216) of apertures 110 in the plate arrangement align such that adjustable-size aperture 418 has its minimum size, represented by opening 522, which is suitable for immobilizing bare optical fiber 101. Once immobilized, bare optical fibers 101 are advantageously secured to plates 106 and 108, such as by using an adhesive, e.g., epoxy, etc.

In addition to the functions of receiving and immobilizing bare optical fiber, apertures 110 are advantageously capable of precisely positioning bare optical fiber in a predetermined location. In other words, as at least one of the plates in the plate arrangement is translated to collapse the adjustable openings, i.e., adjustable-size apertures 418, the bare optical fiber is advantageously urged to a specific location before it is immobilized. Teardrop shape apertures 110 depicted in FIGS. 1–5 that have a large section, i.e., region 214, tapering linearly to a small section, i.e., region 216, are well suited to that end. As described later in this specification in conjunction with FIGS. 8–12, many other shapes are suitable for that purpose as well.

The plate arrangements described thus far have included two plates, i.e., plate 106 and plate 108. In an alternative embodiment in accordance with the illustrative embodiment of the present invention, the plate arrangement includes three plates, as depicted in FIGS. 6 and 7.

Figure 6:
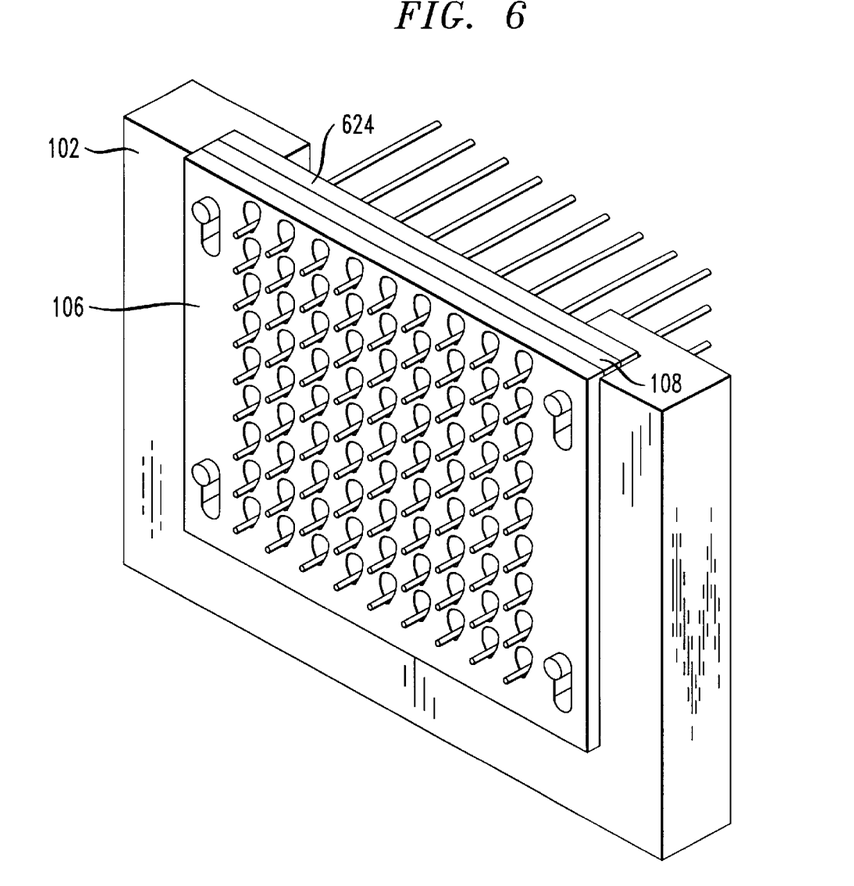
Figure 7:
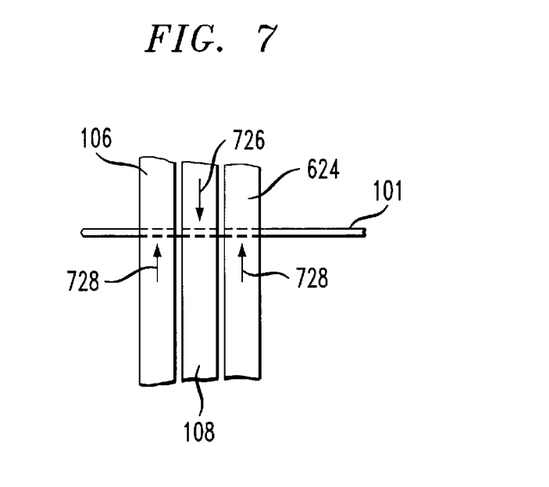
FIG. 7 depicts a side view of the three plates of FIG. 6.

FIG. 6 depicts frame 102 receiving three plates. In the embodiment depicted in FIG. 6, the additional plate, plate 624, is located in "back," such that plate 108 is sandwiched between "front" plate 106 and back plate 624. One bare optical fiber 101 is received by each triplet of (fixed) apertures that define an adjustable-size aperture. For the plate arrangement depicted in FIG. 6, third plate 624 is advantageously oriented in the same direction as front plate 106, i.e., teardrop pointing downward. With this orientation, plate 108 is advantageously translated to alter the size of adjustable-size aperture 418.

For apertures 110 having a teardrop shape (among other shapes), third plate 624 does not impact (either positively or negatively) the ability of adjustable-size apertures 418 to receive or spatially locate bare optical fiber. But third plate 624 does aid in immobilizing received fiber and might improve the angular precision of the immobilized fiber as well. This function of the third plate is depicted in FIG. 7, which shows a cross-sectional side view of FIG. 6. In the configuration shown, wherein adjustable-size aperture 418 has its smallest opening, second region 216, i.e., the smaller circular section, of each aperture 114 in plate 108 applies a pressure or force 726 that is directed downward against bare optical fiber 101, while plates 106 and 624 apply a force that is directed upward. The third plate provides a longer via or through-hole, additional "clamping" capability due to the applied force, and a decreased likelihood of deflecting the fiber away from a desired axis.

As previously indicated, apertures 114 have a variety of shapes other than the teardrop shape are suitable for the present purposes. A few such shapes are described below and depicted in FIGS. 8–12. For clarity of illustration, only a single adjustable-size aperture is depicted in each of FIGS. 8–10 and 12. It will be understand that the plate arrangements shown typically form an array of such adjustable-size apertures 418.

Figure 8A:
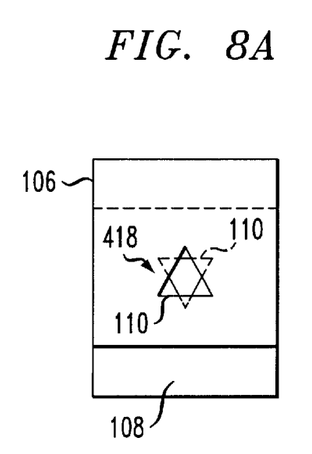
FIGS. 8A–8C depict a plate arrangement having two plates, each of the plates having triangular-shape apertures as a first alternative to teardrop-shape apertures. The Figures depict the translation of one of the plates to change the alignment of the apertures from an alignment suitable for receiving optical fibers (FIG. 8A) to an alignment suitable for immobilizing optical fibers in a precise spatial position (FIG. 8C).
Figure 8B:
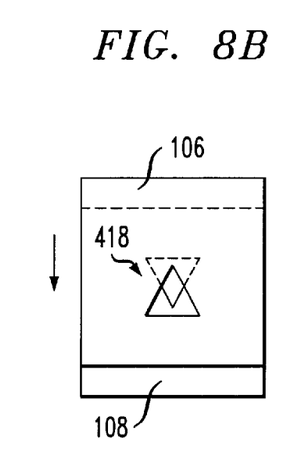
Figure 8C:
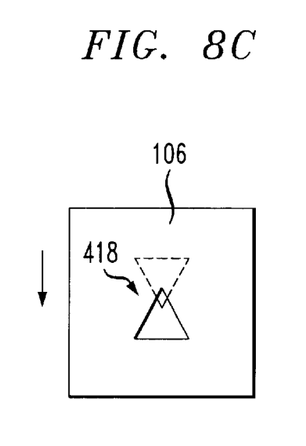

FIGS. 8A–8C depict several configurations of adjustable-size aperture 418 that is formed by a plate arrangement comprising two plates 106 and 108 each having a triangular-shape aperture 110. The plates have a 60-degree in-plane rotation relative to one another. FIG. 8A depicts adjustable-size aperture 418 at its maximum size, which is suitable for receiving bare optical fiber. In FIG. 8B, plate 106 is translated downward somewhat decreasing the size of the opening in adjustable-size aperture 418. FIG. 8C depicts adjustable-size aperture 418 at its minimum size, which is suitable for immobilizing bare optical fiber.

Figure 9A:
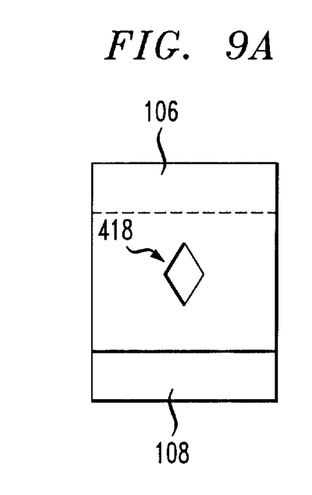
FIGS. 9A–9C depict a plate arrangement having two plates, each of the plates having rhomboid-shape apertures as a second alternative to teardrop-shape apertures. The Figures depict the translation of one of the plates to change the alignment of the apertures from an alignment suitable for receiving optical fibers (FIG. 9A) to an alignment suitable for immobilizing optical fibers in a precise spatial position (FIG. 9C).
Figure 9B:
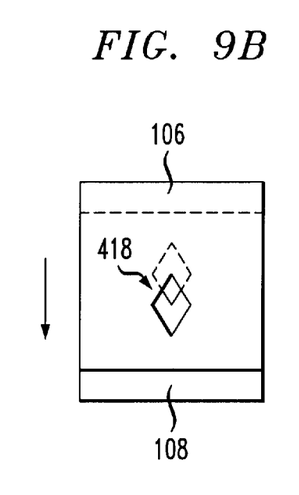
Figure 9C:
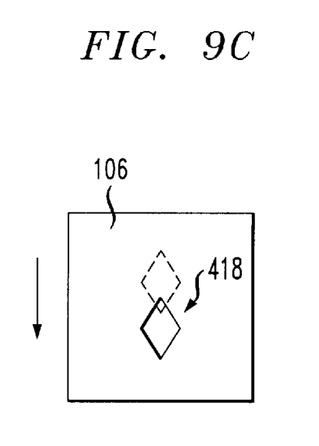

FIGS. 9A–9C depict several configurations of adjustable-size aperture 418 that is formed by a plate arrangement comprising two plates 106 and 108 each having a rhomboid-shape aperture 110. The plates have a 180-degree in-plane rotation relative to one another. FIG. 9A depicts adjustable-size aperture 418 at its maximum size, which is suitable for receiving bare optical fiber. In FIG. 9B, plate 106 is translated downward somewhat decreasing the size of the opening in adjustable-size aperture 418. FIG. 9C depicts adjustable-size aperture 418 at its minimum size, which is suitable for immobilizing bare optical fiber.

Figure 10A:
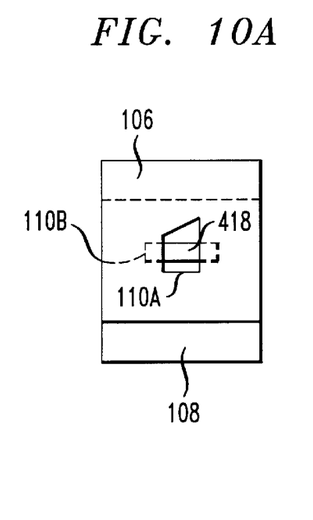
FIGS. 10A–10C depict a plate arrangement having two plates, wherein the shape of the apertures in one of the plates is different than the shape of the apertures in the other of the plates. The Figures depict the translation of one of the plates to change the alignment of the apertures from an alignment suitable for receiving optical fibers (FIG. 10A) to an alignment suitable for immobilizing optical fibers in a precise spatial position (FIG. 10C).
Figure 10B:
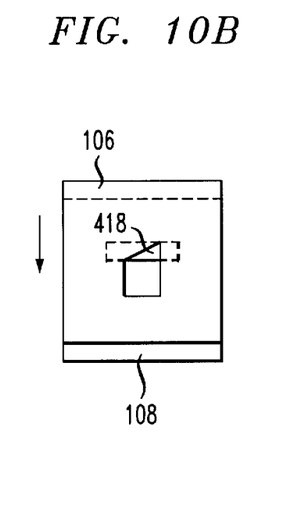
Figure 10C:
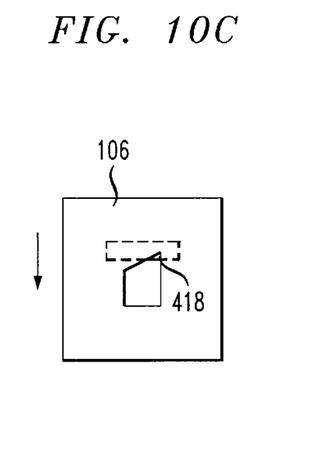

In FIGS. 1–9C, apertures 110 in each plate in the plate arrangement have the same shape. Plate arrangements in accordance with the illustrative embodiment of the present invention are not, however, so limited. For example, FIGS. 10A–10C depict several configurations of adjustable-size aperture 418 that is formed by a plate arrangement comprising two plates have different shape apertures. Specifically, one of the plates (plate 106 in the illustration) has a truncated rectangular-shape aperture 110A and the other plate (plate 108) has a rectangular-shape aperture 110B. FIG. 10A depicts adjustable-size aperture 418 at its maximum size, which is suitable for receiving bare optical fiber. In FIG. 103B, plate 106 is translated downward somewhat decreasing the size of the opening in adjustable-size aperture 418. FIG. 10C depicts adjustable-size aperture 418 at its minimum size, which is suitable for immobilizing bare optical fiber.

Figure 11A:
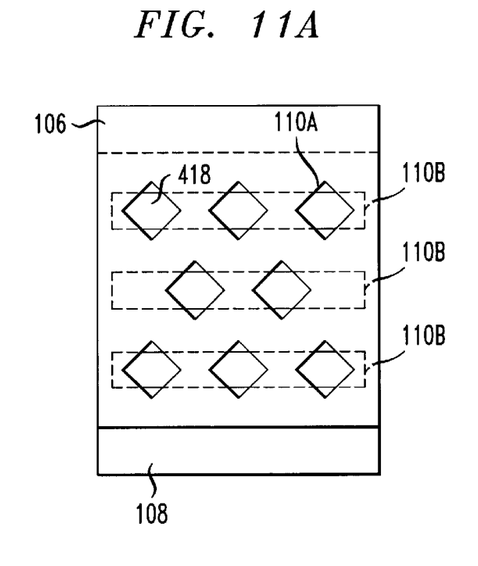
FIGS. 11A–11B depict a plate arrangement having two plates, wherein the shape and number of the apertures in one of the plates is different than the shape and number of the apertures in the other of the plates. The Figures depict the translation of one of the plates to change the alignment of the apertures from an alignment suitable for receiving optical fibers (FIG. 11A) to an alignment suitable for immobilizing optical fibers in a precise spatial position (FIG. 11B).

In FIGS. 1–10C, there has been a one-to-one correspondence between the number of apertures in each plate in the plate arrangement. Such a one-to-one correspondence is not, however, required. For example, FIGS. 1A and 11B, there are fewer apertures 110B in plate 108 than apertures 110A in plate 106.

Figure 11B:
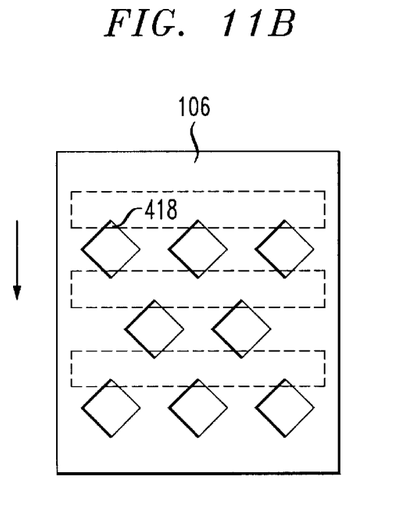

FIGS. 11A–11B depict adjustable-size apertures 418 that are formed by a plate arrangement comprising two plates. One of the plates (plate 106 in the illustration) has square-shape apertures 110A. Apertures 110A have a 45-degree rotation relative to an edge of plate 106 such that a corner of each of apertures 110A point downward. The other of the plates (plate 108) has rectangular-shape apertures 110B that are fewer in number than apertures 110A. FIG. 11A depicts adjustable-size aperture 418 at its maximum size, which is suitable for receiving bare optical fiber. To obtain the configuration depicted in FIG. 11B, plate 106 is translated downward, such that adjustable-size aperture 418 has its minimum size, which is suitable for immobilizing bare optical fiber.

Fiber array faceplate 100 comprising a plate arrangement with three plates in accordance with the illustrative embodiment of the present invention has been described in conjunction with FIGS. 6 and 7. In that embodiment, the primary function of third plate 624 was to aid in immobilizing bare optical fiber, not to position it. But in some other variations of a plate arrangement having three plates, such as the variation depicted in FIGS. 12A–12C, each of the three plates play a role in defining the spatial location of the immobilized bare optical fiber.

Figure 12A:
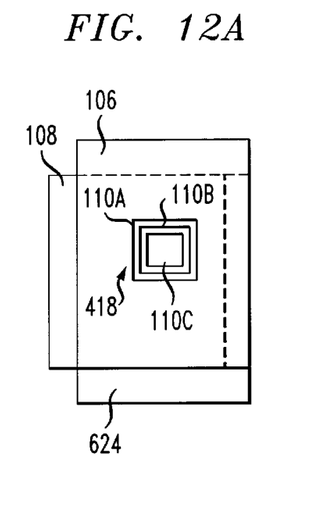
FIGS. 12A–12C depict a plate arrangement having three plates, each plate having apertures. The Figures depict the translation of two of the plates to change the alignment of the apertures from an alignment suitable for receiving optical fibers (FIG. 12A) to an alignment suitable for immobilizing optical fibers in a precise spatial position (FIG. 12C).
Figure 12B:
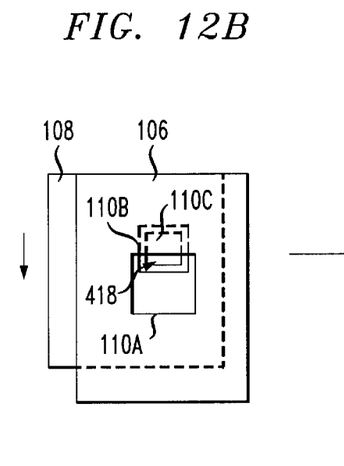
Figure 12C:
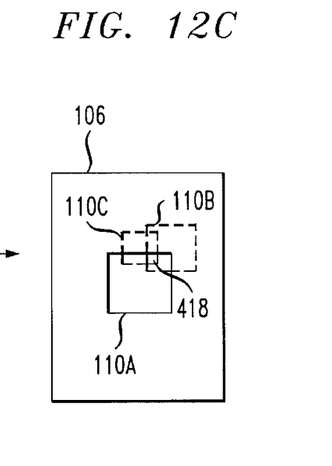

In the plate arrangement depicted in FIGS. 12A–12C, plates 106 (front), 108 (middle) and 624 (back) have respective square apertures 110A, 110B and 110C. For clarity of illustration, the apertures are depicted as having different sizes; in practice, they can be the same size or vary in size from plate to plate. From a fabrication standpoint, i.e., cost, efficiency, etc., it is desirable that the apertures have the same size.

In the variation of the plate arrangement depicted in FIGS. 12A–12C, plate 106 translates vertically, and plate 108 translates laterally. FIG. 12A depicts apertures 110A, 110B and 110C concentrically aligned such that adjustable-size aperture 418 has its maximum size, which is suitable for receiving bare optical fiber. FIG. 12B depicts a configuration in which plate 106 is translated downward thereby reducing the opening of adjustable-size orifice 418. FIG. 12C depicts a configuration wherein plate 108 is translated laterally, reducing adjustable-size orifice 418 to its minimum size, which is suitable for immobilizing bare optical fiber.

It is understood that for the alternate embodiment of a plate arrangement that is depicted in FIGS. 12A–12C, frame 102 is modified from the form depicted in FIG. 6 to allow for lateral translation. Such modification is within the capabilities of those skilled in the art and can be implemented in a variety of ways.

Each adjustable-size aperture described herein, as defined by various plate arrangements and fixed apertures shapes, is advantageously capable of receiving bare optical fiber, precisely positioning the received fiber, and immobilizing the fiber in the desired position. It will be understood that, in accordance with the principles of the invention, bare optical fiber is immobilized by contact with the rim, border, etc., of each of the two or more (fixed) apertures that define each adjustable-size aperture. More particularly, the apertures defining each adjustable-size aperture advantageously collectively provide at least three points of contact with the bare optical fiber to immobilize it. While the fiber can be epoxied to the apertures to facilitate permanent attachment after immobilization, contact with the rim of the apertures, without more, is sufficient for immobilization. It is therefore implicit that, in the phrase "size that is suitable for immobilizing bare optical fiber" (previously defined), bare optical fiber is immobilized due to contact with the rim of the apertures and not by any other instrumentality, e.g., a clamp, etc., that could be used in conjunction with the apertures.

In the various embodiments described herein, a variety of shapes are used to create immobilizing contact. When two plates are used, at least one of the plates includes an array of apertures that advantageously provides two points of contact, the other of the plates having an array of apertures that provide at least one point of contact. When three plates are used, the apertures from each plate can have a shape that provides only one point of contact.

In application of the principles described herein and illustrated in the accompanying Figures, those skilled in the art will be able to develop many other plate arrangements having other aperture shapes that are suitable for use in conjunction with the illustrative embodiment of the present invention. Consequently, those arrangements and shapes fall within the contemplated scope of the appended claims.

As a consequence of an ability to position optical fibers with very high precision, the fiber array faceplates described herein are particularly advantageous for use with single mode fiber, which has stringent positional and angular tolerances. Such single mode fiber has a core having a diameter within the range of 6 to 9 microns, and cladding having a diameter of 125 microns that surrounds the core. It should be understood, however, that the illustrative fiber array faceplates described herein can be used with other types of optical fiber as well, e.g., graded-index fibers having a 50 to 85 micron core and a 125 micron cladding, step-index multimode fibers having a 100 micron core and a 140 micron cladding, etc. It will be appreciated that to the extent that the cladding diameter of such other types of fiber differs from 125 microns, modifications must be made to size-specific embodiments that are described herein. Such alterations are within the capabilities of those skilled in the art.

Plates 106, 108 and 624 are preferably thin, e.g., about 0.5 millimeters, etc., and have flat surfaces. Materials suitable for use as the plates include, without limitation, silicon, metals, ceramic and plastics. Silicon is advantageously used as a consequence of: (1) its low coefficient of thermal expansion that is compatible with micro-lenses and micro-mirrors; (2) its amenability to precision photolithography and etching processes; and (3) polishing properties that are compatible with glass fiber.

The array of apertures 110 in the plates can be formed in any of a variety of ways as a function of the material. Illustrative aperture-forming techniques include deep reactive ion etching ("DRIE"), laser drilling and mechanical drilling, all well-known in the art. DRIE, which is advantageously used for forming apertures in silicon plates, is a plasma-etching process whereby material is removed (etched) by chemical reaction and active radicals. DRIE operates at a relatively low pressure (0.1 to 0.001 torr) and high electric field.

Before inserting optical fiber through apertures 110, it is advantageously stripped of any coating or jacketing layer so that only the cladding and core remain, i.e., bare optical fiber. About 1 to 3 centimeters of fiber is stripped for insertion through apertures 110.

Figure 13:
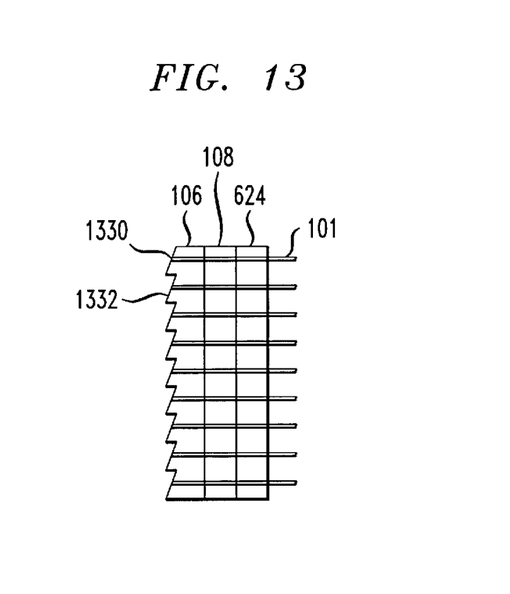
FIG. 13 depicts a plate having a tapered surface and a fiber end having an angled polish.
Figure 14:
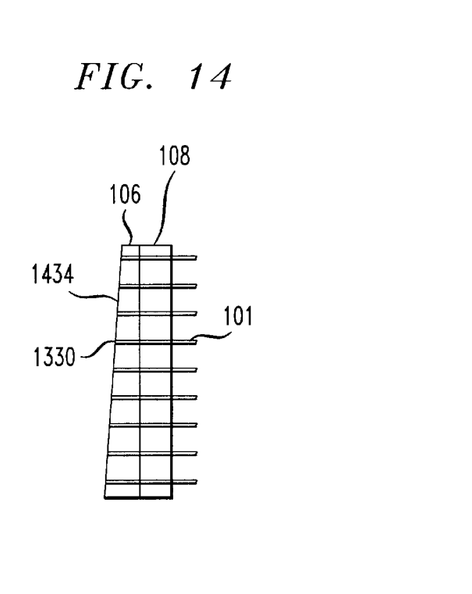
FIG. 14 depicts an alternate implementation of a plate having a tapered surface and a fiber end having an angled polish.

In some fiber array faceplates in accordance with the principles of the invention, the surface of the "front" plate, e.g., plate 106 in the Figures, is angled and end 1330 of bare optical fiber 101 is polished to the same angle, as depicted in two different implementations in FIGS. 13 and 14. The angled surface reduces the amount of "return loss" or reflected light that couples back into the optical fiber.

In FIG. 13, front surface 1332 of plate 106 has a "saw tooth" profile. In FIG. 14, front surface 1434 of plate 106 has a linear variation or taper from top to bottom. The taper can be formed photolithographically, such as by using half-tone masks, or in accordance with the methods described in applicant's co-pending patent application entitled "Optical Fiber Arrays with Reduced Return Loss and Methods for Making Same," filed on Aug. 3, 2000 Ser. No. 09/631,417, which is incorporated by reference herein in its entirety.

We claim:

1. An article comprising:
   a plate arrangement comprising at least two mutually parallel plates, wherein:
   a plurality of apertures are defined in each of said parallel plates;
   said plurality of apertures in said parallel plates align to define a plurality of adjustable-size apertures that are movable between a first configuration and a second configuration;
   in said first configuration, said apertures in each of said parallel plates align such that said adjustable-size apertures have a size that is suitable for receiving bare optical fibers, one to each adjustable-size aperture; and
   in said second configuration, said apertures in each of said parallel plates align such that said adjustable-size apertures have a size that is suitable for immobilizing said received bare optical fibers.

2. The article of claim 1 wherein:
   said plate arrangement comprises a first plate having a first array of apertures; and
   said apertures in said first array have a shape that engages said received bare optical fibers at two or more points of contact.

3. The article of claim 2 wherein:
   said plate arrangement comprises a second plate having a second array of apertures; and
   said first array and said second array have the same number of apertures.

4. The article of claim 2 wherein:
   said plate arrangement comprises a second plate having a second array of apertures;
   said first array has more apertures than said second array; and
   said apertures in said second array engage said bare optical fibers at one point of contact.

5. The article of claim 2 wherein:
   apertures in said first array comprise a shape having a first region and a second region;
   said first region of said apertures has a size that is suitable for receiving bare optical fiber;
   and said second region of said apertures has a size that is suitable for immobilizing said received bare optical fibers.

6. The article of claim 3 wherein said apertures in said first array and said apertures in said second array have the same shape.

7. The article of claim 6 wherein said apertures in said first array and said apertures in said second array have the same size.

8. The article of claim 2 wherein said shape of said apertures in said first array is selected from the group consisting of: teardrop, triangle, rhomboid and polygon.

9. The article of claim 8 wherein said plate arrangement comprises a second plate having a second array of apertures, and wherein a shape of said apertures in said second array is the same as said shape of said apertures in said first array.

10. The article of claim 5 wherein:
    said plate arrangement comprises a second plate having a second array of apertures;
    a shape of said apertures in said second array is the same as said shape of said apertures in said first array;
    a first aperture orientation is defined by a relative position, in said first plate, of said first region of said apertures to said second region of said apertures in said first array;
    a second aperture orientation is defined by a relative position, in said second plate, of said first region of said apertures to said second region of said apertures in said second array; and
    said second aperture orientation has a 180 degree in-plane rotation relative to said first orientation.

11. The article of claim 10 wherein said shape of said apertures in said first array and said shape of said apertures in said second array are selected from the group consisting of: teardrop and triangle.

12. The article of claim 11 wherein:
    said shape of said apertures in said first array and said second array is teardrop;
    said first region comprises a circular section having a diameter of about 500 microns; and
    said second region comprises a circular section having a diameter of about 126 microns.

13. The article of claim 1 further comprising a frame that receives said plate arrangement and establishes and maintains the mutually parallel relationship between said plates, wherein at least one of said plates is slideable within said frame.

14. The article of claim 1 wherein a front plate of said mutually parallel plates comprising said plate arrangement has an angled surface.

15. The article of claim 1 wherein said plate array comprises three mutually parallel plates.

16. The article of claim 1 further comprising a plurality of bare optical fibers, wherein one bare optical fiber of said plurality of same is disposed within each adjustable-size aperture.

17. An article comprising:
    a first plate having a first array of apertures; and
    a second plate parallel to said first plate and having a second array of apertures; wherein:
    said first array of apertures and said second array of apertures collectively define an array of adjustable-size apertures;
    at least one of said first plate and said second plate is movable in translational motion to change a position of said first array of apertures relative to said second array of apertures to change a size of an opening of each adjustable-size aperture between a first size and a second size, wherein:
    said first size is suitable for receiving bare optical fibers, one to each adjustable-size aperture; and
    said second size is suitable for immobilizing said received bare optical fibers.

18. The article of claim 17 wherein said apertures in said first array and said second array comprise a shape having a first region with a relatively larger opening and a second region with a relatively smaller opening.

19. The article of claim 17 wherein:
at said first size, said first region of said apertures in said first array and said first region of said apertures in said second array are aligned with one another; and
at said second size, said second region of said apertures in said first array and said second region of said apertures in said second array are aligned with one another.

20. A method comprising:
defining a plurality of adjustable-size apertures;
adjusting said adjustable-size apertures to a first size that is suitable for receiving bare optical fiber;
inserting bare optical fiber into said adjustable-size apertures; and
adjusting said adjustable-size apertures to a second size that is suitable for immobilizing bare optical fiber.

21. The method of claim 20 wherein said step of defining comprises:
disposing at least a first plate and a second plate in parallel, each plate having a plurality of apertures defined therein; and
aligning said plurality of apertures in said plates to define said plurality of adjustable-size apertures.

22. The method of claim 20 wherein said steps of adjusting comprise moving at least one of said first plate and said second plate in translational motion.

23. The method of claim 20 wherein each said aperture in said first plate and each said aperture in said second plate have a relatively larger region and a relatively smaller region, and further wherein said step of adjusting to a first size comprises aligning said relatively larger region of said plurality of apertures in said first plate with said relatively larger region of said plurality of apertures in said second plate.

24. The method of claim 20 wherein each said aperture in said first plate and each said aperture in said second plate have a relatively larger region and a relatively smaller region, and further wherein said step of adjusting to a second size comprises aligning said relatively smaller region of said plurality of apertures in said first plate with said relatively smaller region of said plurality of apertures in said second plate.

25. An article comprising a plate arrangement having at least two mutually parallel plates, said plates collectively defining means for receiving bare optical fiber, wherein, in a first configuration, said means has a size that is suitable for receiving said bare optical fiber, and in a second configuration, said means has a size that is suitable for immobilizing said received bare optical fibers.

26. The article of claim 25 further comprising means for receiving said plate arrangement, wherein said means establishes and maintains the mutually parallel relationship between said plates.

27. The article of claim 26 wherein said plate arrangement comprises three mutually parallel plates.

28. The article of claim 25 further comprising said bare optical fiber received by said means.

29. An article comprising:
a first aperture defined in a first plate; and
a second aperture defined in a second plate, wherein:
said first plate and said second plate are mutually parallel; and
said first aperture and said second aperture align to define an adjustable-size aperture that is movable between a first configuration and a second configuration; and further wherein:
in said first configuration, said first and second aperture align such that said adjustable-size aperture has a size that is suitable for receiving bare optical fiber; and
in said second configuration, said first and second aperture align such that said adjustable-size aperture immobilizes received bare optical fiber by contacting said received bare optical fiber with a rim of said first aperture and a rim of said second aperture.

* * * * *